July 11, 1967

P. BUGL 3,330,262

SLIDE VALVE FOR SUCTION CONTROL IN TWO-STROKE
ENGINES, PARTICULARLY MINIMUM-SIZED
TWO-STROKE ENGINES
Filed Feb. 6, 1967

INVENTOR.
Paul Bugl
BY Ernest G. Montesque
attorney

United States Patent Office 3,330,262
Patented July 11, 1967

3,330,262
SLIDE VALVE FOR SUCTION CONTROL IN TWO-STROKE ENGINES, PARTICULARLY MINIMUM-SIZED TWO-STROKE ENGINES
Paul Bugl, Vienna, Austria, assignor to Hirtenberger Patronen-, Zundhutchen- und Metallwarenfabrik Aktiengesellschaft, Hirtenberg, Austria, a corporation of Austria
Filed Feb. 6, 1967, Ser. No. 614,179
Claims priority, application Austria, Feb. 11, 1966, A 1,290/66
6 Claims. (Cl. 123—73)

ABSTRACT OF THE DISCLOSURE

A suction control slide valve which is bell-shaped, having a ring partly broken away to form a control opening and a front wall covering one end of the ring, is pivotally mounted about and to a cylindrical cover extension of a crank case cover which projects into the crank case. A suction pipe leads to an intake opening in the cylindrical surface of the cylindrical cover extension adjacent the piston of the engine cylinder. The front wall of the slide valve is axially aligned and operatively connected to a crank shaft for turning the slide valve, causing the control opening to cylindrically pass adjacent the intake opening for controlling a suction mixture.

---

Figure 1:
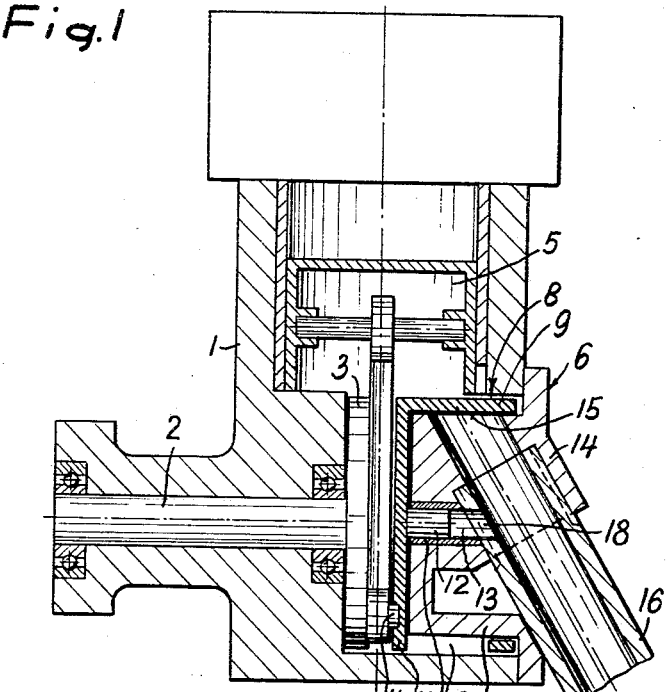

The present invention relates to a slide valve for suction control in two-stroke engines, particularly minimum-sized two-stroke engines.

It is already known to carry out the crank shaft as rotary slide valve in order to control the suction in two-stroke engines, whereby the crank shaft is provided with a bore which has an intake opening. A long suction distance and a reduced compression are the disadvantages of such an embodiment, since the bore increases the volume of the crank case during supercharging. Moreover, the crank shaft must have a greater diameter on account of the bore, which is disadvantageous whenever bearings are used.

Furthermore, flat rotary slide valves as controlling means are already known, which are driven by the crank shaft. In most cases the flat rotary slide valve is journaled on a pivot which is pressed into the cover of the engine. Frictional losses are comparatively greater, since the flat rotary slide valve has to rest closely on the plane surface of the cover. Another disadvantage is the fact that the cross section of the suction area does not maintain its size during the interval of intake and that the mixture hits the crank wall.

It is the object of the present invention to avoid the disadvantages mentioned above and to produce a slide valve for suction control, particularly for minimum-sized two-stroke engines, and to increase the efficiency. The present invention is characterized substantially in that the slide valve is bell-shaped as a ring covered by a front wall provided with a control opening, and that the slide valve rests on a cylindrical extension of the cover of the crank case, said extension being coaxial to the crank shaft and projecting into the crank case, and the slide valve being pivotally mounted on said extension, and that a pivot located at the center of the front wall is provided to journal the slide valve on said extension, and that the front wall of the slide valve engages the crank pin of the crank shaft for rotating the slide valve, the suction pipe with its opening leading to the outer surface of said extension of the cover and forming an angle of 30 degrees with the axis of the cylinder, and said opening co-operating with the control opening of the ring for controlling the suction mixture. Such an embodiment shows mainly the following advantages. During the lifting movement of the piston the mixture flows into the cylinder in an upward direction and thus with the least resistance, the suction distance is short, the piston is not loaded thermally, since it is contacted directly with a fresh mixture, obtaining thus a smaller dead space in the crank case during supercharging (rate of filling).

Location and size of the control opening of the ring should, in relation to the intake opening of the cover extension, preferably be such that the control opening of the ring begins to uncover the intake opening after turning the ring by 45 degrees from the lower dead center, that the intake opening is completely uncovered after another turn by 45 degrees, that it remains completely uncovered during a further turn by 90 degrees until the upper dead center is reached, and that the intake opening is afterwards covered by the ring during a further turn by 45 degrees. It is thus possible to ensure an unvarying suction cross-section during 90 degrees of the suction process, while there is a total interval of uncovering amounting to 180 degrees in connection with the rotation of the crank shaft and the movement of the piston. With an embodiment according to the invention the efficiency is considerably increased, as e.g. tests with a 2.5 cm.$^3$ engine showed an increase in efficiency of 23% over flat rotary slide valves.

In order to achieve sufficient lubrication of the rotary slide valve required because of the high speed of minimum-sized engines, according to the invention the slide valve is mounted with play on the extension of the cover, and an oil groove is provided in the plane surface of the extension of the cover, which runs from the circumference of the surface to the bore of the piston, and in that the bore of the piston is continued further into the carburetor pipe. In order to keep the slide valve at a distance from the cover extension the bearing of the pivot may extend beyond the cover extension.

Figure 4:
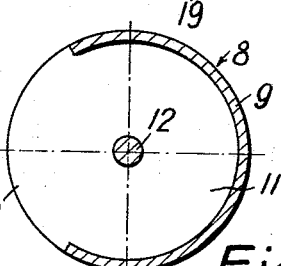

In the drawing an embodiment of the invention is shown by way of example. FIGURE 1 shows a longitudinal sectional view of the engine with a slide valve for suction control, FIGURE 2 shows the plane surface of the cover extension provided with an oil groove, FIGURES 3 and 4 show side and cross-sectional views of the slide valve along line IV—IV of FIGURE 3, and FIGURES 5 to 8 shows diagrams of the successive positions of the slide valve.

According to FIGURE 1 the crank shaft 2 is journaled in the crank case 1 of the engine, and is provided with a crank disc 3 and a crank pin 4, which is connected with the piston 5 of the engine cylinder. The crank case is closed by means of a cover 6, which projects into the crank case with a cylindrical extension 7. A slide valve 8 is mounted on the cover extension 7, and consists of a ring 9 with a control opening 10, and a front wall 11 (FIGURES 3, 4). The crank pin 4 fits into a depression of the front wall 11 for turning the slide valve 8. The front wall 11 is provided with a pivot 12 which is inserted into a central bore 13 of the cover extension 7 for supporting the slide valve 8. Pointing upwards to the cylinder at an angle of 30 degrees to the axis of the cylinder, a suction pipe 14 leads through an opening 15, which co-operates with the control-opening 10 of the ring, into the cover extension 7. Carburetor pipe 16 is screwed into the suction pipe.

Figure 2:
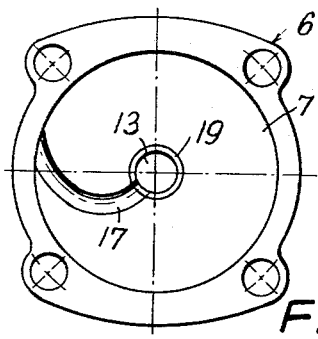
Figure 3:
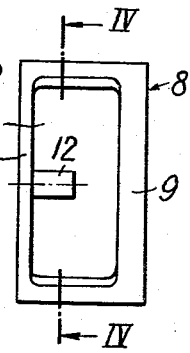
Figure 5:
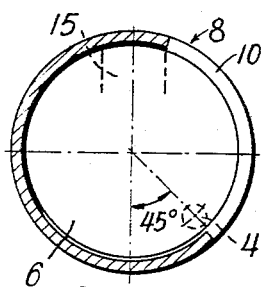
Figure 6:
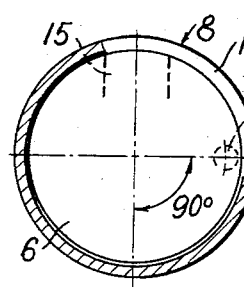
Figure 7:
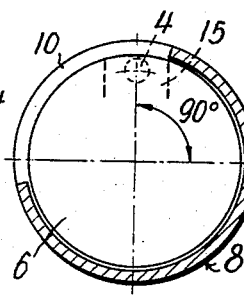
Figure 8:
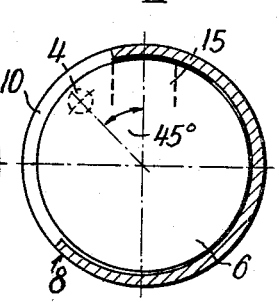

A clearance or play of 0.02 mm. is provided between the front wall 11 of the slide valve and the plane surface of the cover extension, as well as between the inner surface of the ring 9 and the outer surface of the cylindrical extension 7, so that the slide valve may revolve freely on the cover extension, wheerby an oil grove 17 is provided in the plane surface, which runs from the circumference to the bore of the pivot 13 (FIGURE 2). By an adjoining bore 18 the bore 13 is extended into the carburetor pipe 16. To secure the clearance the bearing 19 extends beyond the plane surface. Because of low pressure in the carburetor pipe 16 and excessive pressure in the crank case circulation of the oil is obtained, whereby the oil containing fuel mixture passes from the carburetor pipe into the space between slide valve 8 and cover extension 7, and is led through oil groove 17 to the bore of the piston, and back to the carburetor pipe 16.

As can be seen from FIGURES 5 to 8 the suction control with the bell-shaped slide valve according to the invention works such that the control opening 10 is moved towards the opening 15 after having been turned by an angle of 45 degrees from the lower dead center, that is the lowest portion of the crank pin 4, and that on account of another turn the opening is slowly uncovered, whereby a further turn by 45 degrees effects total uncovering of the intake opening 15, this state remains during another turn by 90 degrees, whereafter the upper dead center is reached, i.e., after a rotation by 180 degrees; then the intake opening 15 is slowly covered again, which is completed by a further turn by 45 degrees, whereafter the opening remains covered until the process as described above is repeated.

I claim:
1. A slide valve for suction control in two-stroke engines, comprising
   a crank case,
   a crank shaft journaled in said crank case,
   a crank case cover having a cylindrical cover extension projecting into said crank case,
   said cylindrical cover extension including a circumferential surface and a plane surface, the latter having a bearing therein aligned coaxially to said crank shaft,
   a bell-shaped slide valve including a ring and a front wall covering one end of said ring,
   said ring being broken away in part and defining a circumferential control opening,
   a pivot at the center of said front wall of said slide valve and journaled in said bearing in said cyindrical cover extension, said slide valve thereby resting on and being rotatably mounted on said cylindrical cover extension,
   a suction pipe leading to said circumferential surface of said cylindrical cover extension and having an intake opening on said circumferential surface, and
   means for operatively connecting said crank shaft to said front wall of said slide valve for rotating said slide valve relative to said cylindrical cover extension, said intake opening thereby cooperating with said control opening of said ring of said slide valve for controlling a suction mixture when said slide valve is rotated by said crank shaft.

2. The slide valve, as set forth in claim 1, further including
   a piston cylinder located adjacent said intake opening, and
   said suction pipe forms an angle of about 30° with the axis of said piston cylinder.

3. The slide valve, as set forth in claim 1, wherein
   said control opening is sized and located relative to said intake opening, so as to begin to uncover said intake opening after said slide valve is turned by about 45° from a first lower dead center position, said intake opening being completely uncovered after another 45° turn, said intake opening remaining completely uncovered during a further turn of 90°, and
   said intake opening being covered by said ring of said slide valve during a further turn of said slide valve by 45°.

4. The apparatus, as set forth in claim 1, wherein
   said slide valve is mounted via said pivot in said bearing on said cylindrical cover extension with play and with a clearance therebetween,
   said plane surface of said cylindrical cover extension formed with an oil groove therein,
   said oil groove extending from said circumferential surface of said cylindrical cover extension to said bearing,
   a carburetor pipe in fluid communication with said suction pipe, and
   said bearing extending in fluid communication into said carburetor pipe.

5. The apparatus, as set forth in claim 1, wherein
   said bearing extends into said crank case beyond said plane surface of said cylindrical cover extension, thereby providing a clearance between said cylindrical cover extension and said slide valve.

6. The slide valve, as set forth in claim 1, wherein
   said connecting means comprises,
   a crank disc secured to said crank shaft,
   a crank pin mounted on said crank disc, and
   said front wall of said slide valve having a depression into which said crank pin is engaged.

References Cited

UNITED STATES PATENTS 1,001,866  8/1911  Lasgy _____ 123—73

FOREIGN PATENTS 493,548  4/1954  Italy.

CARLTON R. CROYLE, *Primary Examiner.*

W. E. BURNS, *Assistant Examiner.*